3,033,900
METHOD OF PREPARING CALCIUM GLUCOHEPTONATE
Arthur G. Holstein, Lake Bluff, Ill., assignor to Pfanstiehl Laboratories, Inc., Waukegan, Ill., a corporation of Illinois
No Drawing. Filed Mar. 25, 1958, Ser. No. 723,671
8 Claims. (Cl. 260—535)

This invention relates to methods of preparing glucoheptonates and more particularly to novel improvements in the preparation of calcium glucoheptonate.

The preparation of a high purity calcium glucoheptonate for use in parenteral solutions has been difficult and costly. Conventional methods involve the reaction of glucose with hydrocyanic acid and conversion of the nitrile thus formed into calcium glucoheptonate with calcium or barium hydrate. A pure grade of calcium cyanide for this purpose is not available commercially. The high alkalinity developed when calcium or barium hydrate is employed gives rise to a high level of degradation which requires further processing by converting the calcium glucoheptonate to glucoheptolactone and its equilibrium component, glucoheptonic acid by the use of sulfuric or oxalic acid. In another process, dextrose is reacted with sodium cyanide in the presence of calcium chloride which produces a double salt. This is then converted to the glucoheptolactone and glucoheptonic acid. Subsequent treatment with calcium hydrate then results in a calcium glucoheptonate which is heavily contaminated with sulfates, oxalates or chlorides, or combinations thereof. It is extremely difficult to remove such impurities once the calcium salt is prepared. Any such contaminants in the solution during the preparation of the salt appear in the final product, since calcium glucoheptonate is not crystallizable from aqueous solutions and the recovery of amorphous solid material results in occluded impurities. The presence of trace quantities of contaminants frequently destroys the stability of parenteral solutions prepared from calcium glucoheptonate containing impurities such as sulfates and chlorides.

One of the objects of the present invention is to provide an improved process of preparing calcium glucoheptonate having a high order of purity, which process is characterized by the avoidance of the introduction of contaminants in the various process steps, thereby avoiding their presence in the finished product.

Another object is to provide an improved process of preparing calcium glucoheptonate having a high order of purity and a high level of stability in aqueous solution.

A further object is to provide an improved process of preparing calcium glucoheptonate of high purity in substantially quantitative yields.

A further object is to provide an improved process of preparing calcium glucoheptonate having a level of sulfate impurity below the point at which precipitation will occur in stored aqueous solutions of the substance.

Further objects will become apparent from the following description and examples.

According to the present invention, generally stated, a substantially pure sodium glucoheptonate in the form of crystalline alpha sodium glucoheptonate, or a syrup composed of an aqueous solution of alpha and beta sodium glucoheptonates, in which the level of sulfate impurities is not detectable by the usual quantitative methods, is dissolved in water and the resulting solution is passed through a bed or column of cation exchange resin from which sulfate impurities have been removed by previous washing with deionized water. Sodium ions are removed from the sodium glucoheptonate solution by this procedure. The operation is repeated if necessary until the effluent is reduced in sodium content to a point below 0.4 mg. per milliliter of the effluent, calculated as sodium sulfate. The resulting effluent is treated with sufficient calcium carbonate having a very low sulfate impurity content, preferably below 0.05%, calculated as calcium sulfate to convert the glucoheptolactone and its equilibrium component, glucoheptonic acid, to calcium glucoheptonate. During this conversion, the effluent is desirably heated, preferably to a temperature of about 80° C., in order to facilitate the conversion of the lactone through the equilibrium component, glucoheptonic acid, to the calcium salt of the acid. Activated carbon may be added to the resulting solution to effect a reduction in the level of any residual color. The solution is then filtered and evaporated under high vacuum to a specific gravity of 1.45 or slightly higher. The resulting syrup is then run in a very fine stream into anhydrous methanol under very active agitation. Amorphous particles of dehydrated calcium glucoheptonate are formed in the methanol. Complete dehydration of the particles is effected by transferring them to a fresh quantity of anhydrous methanol. The dehydrated solid calcium glucoheptonate particles are then centrifuged and dried in vacuo at a temperature sufficient to remove all traces of methanol without decomposition of the product. A temperature of 50° C. has been found to be satisfactory. In place of the methanol dehydration procedure, the syrup may be dehydrated to a solid by other suitable methods, for example by drum drying the syrup or spray drying the syrup.

Any resin exchange medium having a high capacity for cation exchange may be employed for removing the sodium from the sodium glucoheptonates. Nuclear sulfonic acid polystyrene cation exchange resins are particularly suitable for this purpose. Resins sold under the trade names Amberlite IR 120 and Duolite C 25 are representative of this type of resin. The resin bed is prepared for use in the process of this invention by regeneration with either sulfuric acid or hydrochloric acid and is then washed with deionized water until all traces of the regenerating acid are removed. Barium chloride solution may be used on a sample of the effluent to test for the presence of sulfates and silver nitrate for the presence of chlorides. The effluent from the bed after passage of sodium glucoheptonate solution therethrough is tested to determine the presence of sodium ions therein, for example, by treating a portion of the effluent with sulfuric acid and evaporating, ashing the residue and weighing the residue. The sodium content should be reduced to a point below 0.4 mg. per milliliter. In practice it is not difficult to achieve a much lower level than this. If the bed is of sufficient size, one pass therethrough will accomplish this purpose. If the level of sodium is too high, another pass is indicated.

In place of calcium carbonate, calcium hydrate or lime may be employed. It is usually difficult however to obtain calcium hydrate or lime of sufficiently low sulfate and iron content for this purpose. It is essential that the calcium carbonate or lime be very low in sulfate and iron. In parenteral solutions containing vitamin C, iron tends to cause decomposition of this vitamin. Sulfates cause turbidity on storage in ampoules. Calcium carbonate possesses a further advantage in that the pH control of the resulting calcium glucoheptonate solution is more readily controlled, since calcium carbonate is too insoluble to materially raise the pH above the neutralization point desired. Care has to be taken also to insure that the glucoheptolactone is completely converted to calcium glucoheptonate. By applying heat to the glucoheptolactone solution during the formation of calcium glucoheptonate, the conversion is accelerated. Completion of the reaction can be ascertained by measuring the pH at 15 to 20 minute intervals when the pH appears to have become stable at about pH 6.5. This procedure is advisable since the lactone is substantially neutral and calcium carbonate is relatively insoluble in water. Adjustment of the pH of the syrup after evaporation and before dehydration may be made by adding a sulfate-free lime water to raise the pH or by adding a water solution of the lactone while the syrup is hot to lower the pH.

The following examples will serve to illustrate the improved process of the present invention.

Example I

Sodium glucoheptonate in crystalline form having a very low sulfate content is now available commercially as crystalline alpha sodium glucoheptonate, characterized by a specific rotation of +6.06 (10 percent solution at 20° C.) and a melting point (with decomposition) of 161° C. A solution of 450 pounds of crystalline alpha sodium glucoheptonate (containing approximately 30 percent water) in 240 gallons of deionized water is prepared. Before use, the deionized water is checked for sulfate, iron and chloride content by procedures such as those described hereinabove. The solution is passed through a 25 cubic foot bed of a cation exchange resin identified as a nuclear sulfonic acid polystyrene cation exchange resin and sold under the trade name "Amberlite IR–120." The resin exchange bed used is one which has been freshly regenerated with sulfuric acid and washed with deionized water until substantially no sulfates can be detected in the effluent. The sodium glucoheptonate liquor which has passed through the resin bed is checked for residual sodium content by evaporating a specimen in the presence of a few drops of sulfuric acid, ashing the residue and weighing it. If residual sodium ion is found, the liquor is recycled. The effluent is then heated to 80° C. and treated with sufficient calcium carbonate (having a low sulfate content) to form calcium glucoheptonate with the entire amount of glucoheptonic values present in the liquor. Approximately 100 pounds of calcium carbonate are required. The reaction is complete when the pH remains stable for 15–20 minutes. If the pH is higher than 6.5, it is usually adjusted to that pH by the addition of small quantities of the resin bed effluent reserved for this purpose. Thereupon approximately 12 pounds of activated carbon such as Norit SG2X is added with agitation and the liquor is filtered and evaporated under vacuum to a specific gravity of 1.45 or slightly higher. With a vacuum of 27 inches, the temperature during the evaporation operation is approximately 45° C. The resulting syrup is run in a very fine stream into approximately 85 gallons of anhydrous methanol. Particles of anhydrous calcium glucoheptonate are formed. When 10–20 pounds of this material has formed the material is transferred to fresh anhydrous methanol (approximately 85 gallons) to insure complete dehydration. The precipitation process and further dehydration are continued until all of the syrup has been run into the methanol. The solid calcium glucoheptonate is recovered with the aid of a centrifuge and heated in vacuo at 50° C. to remove residual methanol. When checked for sulfate content, the product is found to possess substantially no detectable amount of sulfate. The iron content is also extremely low. The product when dissolved in water and placed in ampoules is found to be substantially free from precipitation of sulfates over long periods of storage.

Example II

One hundred gallons of a syrup containing alpha and beta sodium glucoheptonates (35 percent solids) with no detectable sulfates is diluted to 240 gallons. The solution is passed through a 25 cubic foot bed of Amberlite IR–120 cation exchange resin. The effluent upon testing for sodium ions is found to be substantially free from sodium. The effluent is heated at 80° C. and treated with sufficient calcium carbonate (sulfate free) to convert the glucoheptonic values contained therein to calcium glucoheptonate. The reaction is complete when the pH of the solution remains constant. In place of calcium carbonate, sulfate-free lime may be used but care has to be taken to avoid adding more than the stoichiometric quantity of lime and not to exceed the desired pH, which is about 6.5. Thereupon the solution is treated with 6 pounds of activated carbon (Norit S.G.2X) with agitation and filtered. The clear liquor is evaporated under vacuum (27 inches) at 45° C. to a specific gravity of 1.45 or slightly higher. The resulting syrup is then run in a very fine stream into anhydrous methanol (approximately 40 gallons) whereupon a finely divided dehydrated solid calcium glucoheptonate is formed. This material is treated with fresh anhydrous methanol to complete the dehydration. As an alternative procedure, a quantity of methanol may be added to the syrup initially to alter the viscosity of the syrup and facilitate the pouring of the syrup into anhydrous methanol for the precipitation operation. The methanol slurry after dehydration of the calcium glucoheptonate is complete is then centrifuged and the solid material is heated in vacuo at 50° C. to remove residual methanol. The resulting product exhibits excellent stability in aqueous solutions stored in ampoules over long periods of time.

Others may practice this invention in any of the numerous ways which will be suggested to one skilled in the art upon a reading of this specification. It is intended that all such practice of the invention shall be included hereunder provided it falls within the scope of the appended claims.

I claim:

1. The method of preparing calcium glucoheptonate comprising contacting an aqueous solution of sodium glucoheptonate having a sulfate anion content below 0.05%, calculated as calcium sulfate with a cation-exchange resin the effluent from which has a sulfate anion content below 0.05%, calculated as calcium sulfate until the sodium content of said solution is below 0.4 mg. per milliliter, heating the resulting solution to about 80° C. with a material selected from the group consisting of calcium carbonate and calcium hydroxide, said material having a sulfate anion content below about 0.05%, calculated as calcium sulfate, and said material being used in quantity sufficient to convert the total glucoheptonic values in said solution to calcium glucoheptonate, concentrating the resulting solution, and recovering solid amorphous calcium glucoheptonate from the concentrated solution.

2. The process of claim 1 in which the calcium ion source is calcium carbonate having a sulfate anion content below about 0.5%, calculated as calcium carbonate.

3. The process of claim 1, in which the concentrated solution of calcium glucoheptonate is spray dried.

4. The process of claim 1, in which the concentrated solution of calcium glucoheptonate is added to anhydrous methanol in a fine stream and the solid calcium glucoheptonate is recovered from the resulting slurry.

5. The process of claim 1, in which the aqueous solution of calcium glucoheptonate is concentrated to a specific gravity of approximately 1.45, and in which the precipitated calcium glucoheptonate is transferred from the anhydrous methanol slurry to fresh anhydrous methanol, and solid anhydrous calcium glucoheptonate is recovered from the resulting slurry.

6. The process of claim 1, in which the starting material is an aqueous solution of a syrup consisting of an aqueous mixture of alpha and beta sodium glucoheptonates, said syrup having a sulfate anion content below the level detectable by quantitative analytical methods.

7. The process of claim 1, in which the concentration of the aqueous solution of calcium glucoheptonate is effected by evaporation in vacuo below about 50° C.

until the specific gravity of the concentrate is approximately 1.45.

8. The process of claim 1, in which the sodium ion-depleted aqueous solution is heated at about 80° C. with calcium carbonate having a sulfate anion content below about 0.05%, calculated as calcium sulfate, until the pH of the solution remains stable for about 15–20 minutes.

References Cited in the file of this patent

UNITED STATES PATENTS

| | | |
|---|---|---|
| 2,511,825 | Myers | June 13, 1950 |
| 2,666,759 | Wood | Jan. 19, 1954 |
| 2,744,840 | Daniels et al. | May 8, 1956 |

FOREIGN PATENTS

| | | |
|---|---|---|
| 635,367 | Great Britain | Apr. 5, 1950 |

OTHER REFERENCES

Journal of Research of the National Bureau of Standards, vol. 54, No. 4, April 1955, pages 201–203.